(12) United States Patent
Choi et al.

(10) Patent No.: US 7,282,191 B1
(45) Date of Patent: Oct. 16, 2007

(54) CARBON NANOTUBE GROWTH

(75) Inventors: Hee Cheul Choi, Pohang (KR); Hongjie Dai, Sunnyvale, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 247 days.

(21) Appl. No.: 10/728,070

(22) Filed: Dec. 4, 2003

Related U.S. Application Data

(60) Provisional application No. 60/431,657, filed on Dec. 6, 2002.

(51) Int. Cl.
*D01F 9/12* (2006.01)

(52) U.S. Cl. ............... 423/447.3; 977/843; 427/249.1

(58) Field of Classification Search ............ 423/447.3; 502/258, 338; 427/249.1; 977/843
See application file for complete search history.

(56) References Cited

U.S. PATENT DOCUMENTS

| | | | | |
|---|---|---|---|---|
| 4,111,842 | A * | 9/1978 | van Montfoort et al. | ... 502/183 |
| 4,513,098 | A * | 4/1985 | Tsao | ............ 502/216 |
| 4,831,011 | A * | 5/1989 | Oikawa et al. | ............ 502/406 |
| 6,333,016 | B1 * | 12/2001 | Resasco et al. | ........... 423/447.3 |
| 6,413,487 | B1 * | 7/2002 | Resasco et al. | ........... 423/447.3 |
| 6,713,519 | B2 * | 3/2004 | Wang et al. | ............... 518/715 |
| 6,797,184 | B2 * | 9/2004 | Shiota et al. | ............... 210/762 |
| 2003/0039750 | A1 * | 2/2003 | Mao et al. | .................. 427/180 |
| 2003/0161782 | A1 * | 8/2003 | Kim | ........................ 423/447.3 |
| 2003/0181328 | A1 * | 9/2003 | Hwang et al. | .............. 502/325 |

OTHER PUBLICATIONS

Serp, P.; Kalck, P.; Feurer, R.; Chemical Vapor Deposition Methods for the Controlled Preparation of Supported Catalytic Materials, Chem. Rev. 2002, 102, 3085-3128.*
Choi, H.C., Kundaria, S., Wang, D., Javey, A., Wang, Q., Rolandi, M., and Dai, H., Efficient Formation of Iron Nanoparticle Catalysts on Silicon Oxide by Hydroxylamine for Carbon Nanotube Synthesis and Electronics, Nano Lett., 3, 2, 157-161, 2003.*
Serp, P.; Kalck, P.; Feurer, R.; Chemical Vapor Deposition Methods for the Controlled Preparation of Supported Catalytic Materials, Chem. Rev. 2002, 102, 3085-3090.*
Dai, H. In *Carbon Nanotubes*; Dresselhaus, M. S., Dresselhaus, G., Avouris, P., Eds.; Springer: Berlin, 2001; vol. 80; pp. 29-53.
Kong, J.; Soh, H.; Cassell, A.; Quate, C. F.; Dai, H. *Nature* 1998, 395, 878-881.
Cassell, A.; Franklin, N.; Tombler, T.; Chan, E.; Han, J.; Dai, H. *J. Am. Chem. Soc.* 1999, 121, 7975-7976.
Zhang, Y.; Chan, A.; Cao, J.; Wang, Q.; Kim, W.; Li, Y.; Morris, N.; Yenilmez, E.; Kong, J.; Dai, H. *Appl. Phys. Lett.* 2001, 79, 3155-3157. (abstract only).
Ural, A.; Li, Y.; Dai, H. *Appl. Phys. Lett.* 2002, 81, 3464-3466. (abstract only).
Soh, H.; Quate, C.; Morpurgo, A.; Marcus, C.; Kong, J.; Dai, H. *Appl. Phys. Lett.* 1999, 75, 627-629.
Tombler, T.; Zhou, C.; Alexeyev, L.; Kong, J.; Dai, H.; Liu, L.; Jayanthi, C.; Tang, M.; Wu, S. Y. *Nature* 2000, 405, 769-772.
Kong, J.; Franklin, N.; Zhou, C.; Chapline, M.; Peng, S.; Cho, K.; Dai, H. *Science* 2000, 287, 622-625.
Zhou, C.; Kong, J.; Dai, H. *Appl. Phys. Lett.* 2000, 76, 1597-1599. (abstract only).
Cheung, C.; Kurtz, A.; Park, H.; Lieber, C. *J. Phys. Chem.* 2002, 106, 2429-2433.
Jorio, A.; Saito, R.; Hafner, J. H.; Lieber, C. M.; Hunter, M.; McClure, T.; Dresselhaus, G.; Dresselhaus1, M. S. *Phys. Rev. Lett.* 2001, 86, 1118-1121. (abstract only).
Tans, S.; Verschueren, A.; Dekker, C. *Nature* 1998, 393, 49-52.

* cited by examiner

*Primary Examiner*—Stuart Hendrickson
(74) *Attorney, Agent, or Firm*—Crawford Maunu PLLC

(57) ABSTRACT

The growth of carbon nanotubes such as single-walled carbon nanotubes (SWNTs) is achieved using a catalyst and carbon feedstock gas, with the catalyst being delivered using an approach for relatively clean delivery and placement thereof. In one example embodiment, nanoparticles are deposited from solution onto a substrate, and the substrate is subsequently heated to form catalyst material from the nanoparticles. A carbon nanotube is then grown from the catalyst material, using the catalyst material to catalyze a reaction that is used to grow the carbon nanotube. In one implementation, hydroxylamine is used in the deposition of nanoparticles of a catalyst precursor material from aqueous iron-containing solutions onto an $SiO_2$ substrate. The nanoparticles are heated and used to form catalyst material on the $SiO_2$ substrate, which is used in the subsequent growth of carbon nanotubes via the introduction of carbon-containing gas to the nanoparticles.

21 Claims, 7 Drawing Sheets

CARBON NANOTUBE GROWTH

RELATED PATENT DOCUMENTS

This patent document claims priority to U.S. Provisional Patent Application Ser. No. 60/431,657, entitled "Carbon Nanotube Growth" and filed on Dec. 6, 2002, to which priority is claimed under 35 U.S.C. §120 for common subject matter.

FIELD OF THE INVENTION

The present invention relates generally to carbon nanotubes and more particularly to the growth of carbon nanotubes involving catalyst delivery and patterning.

BACKGROUND

Carbon and carbon-containing nanotubes are unique carbon-based, molecular structures that exhibit interesting and useful electrical properties. There are two general types of carbon nanotubes, referred to as multi-walled carbon nanotubes (MWNTs) and single-walled carbon nanotubes (SWNTs). SWNTs have a cylindrical sheet-like, one-atom-thick shell of hexagonally-arranged carbon atoms, and MWNTs are typically composed of multiple coaxial cylinders of ever-increasing diameter about a common axis. Thus, SWNTs can be considered to be the structure underlying MWNTs and also carbon nanotube ropes, which are uniquely-arranged arrays of SWNTs.

Due to their unique electrical properties, carbon nanotubes are being studied for development, and in some instances, implemented, in a variety of applications. These applications include, among others, chemical and bio-type sensing, field-emission sources, selective-molecule grabbing, nano-electronic devices, and a variety of composite materials with enhanced mechanical and electro-mechanical properties. More specifically, for example, in connection with chemical and biological detection, carbon nanotubes are being studied for applications including medical devices, environmental monitoring, medical/clinical diagnosis and biotechnology for gene mapping and drug discovery. For general information regarding carbon nanotubes, and for specific information regarding SWNTs and related applications, reference may be made generally to the above-mentioned patent document and also to: "Carbon Nanotubes: Synthesis, Structure, Properties and Applications," M. S. Dresselhaus, G. Dresselhaus and Ph. Avouris (Eds.), Springer-Verlag Berlin Heidelberg, New York, 2001; and "T. Single-shell Carbon Nanotubes of 1-nm Diameter," Iijima, S. & Ichihashi, Nature 363, 603-605 (1993).

In some instances, the growth of SWNTs involves the formation of catalytic sites for growing carbon nanotubes, which can be accomplished using a variety of approaches. One such approach involves the use of an iron (Fe) containing catalyst supported on aluminum oxide type materials. While SWNTs can be readily grown using this approach, the catalytic regions on the substrate are often unclean. In addition, SWNTs grown from relatively dirty catalytic sites (e.g., with mound-like patterned alumina particles) can sometimes exhibit undesirable characteristics with the SWNTs themselves or for the implementations and processes in which the SWNTs are involved. For instance, when using atomic force microscopy (AFM) for the evaluation and/or processing of SWNTs grown in this manner, the AFM imaging tip can frequently pick up dirt particles. Catalyst supported on powders can also be challenging to implement due to difficulties associated with controlling individual catalytic nanoparticle size and in the patterning of nanoparticles at smaller scales (e.g., less than about 1 μm).

These and other factors have presented challenges to the large-scale production of carbon nanotubes, such as large arrays of nanotubes on full four-inch wafers.

SUMMARY

The present invention is directed to overcoming the above-mentioned challenges and others related to the types of devices and applications discussed above and in other nanotube applications. These and other aspects of the present invention are exemplified in a number of illustrated implementations and applications, some of which are shown in the figures and characterized in the claims section that follows.

In one example embodiment of the present invention, a single-walled carbon nanotube (SWNT) is grown using a catalyst-forming approach, the substrate and the catalyst material having characteristics of the catalyst material being formed by immersion in an aqueous solution including iron-containing calcined nanoparticles.

According to another example embodiment of the present invention, a substrate is prepared for nanotube growth using an approach involving immersion of the substrate in a solution and formation of catalyst particles in connection therewith. The substrate is processed to form hydrogen-oxide molecules thereon, with the solution including an iron-containing salt and hydroxyl material that react with the hydrogen-oxide molecules and form iron-oxide catalyst particles on the substrate. In connection with this example embodiment, it has been discovered that the substrate is relatively clean and free from undesirable materials, addressing challenges including those discussed above.

In another example embodiment of the present invention, carbon nanotubes are grown from a substrate using an approach including catalyst formation from a solution. Hydroxyl groups are formed on a substrate including silicon oxide, which is subsequently immersed in an aqueous solution including an iron salt and a reducing agent. In the presence of the hydroxyl groups and the reducing agent, iron-containing nanoparticles are formed on the substrate. The substrate is subsequently heated (e.g., calcined) to form iron-oxide catalyst particles from the iron-containing nanoparticles. A carbon-containing gas is then introduced to the iron-containing nanoparticles, which catalyzes a reaction of the carbon-containing gas to grow a carbon nanotube. With this approach, the resulting nanotube (e.g., a SWNT) and adjacent substrate and catalyst areas are relatively free of undesirable characteristics such as those discussed above.

In still another example embodiment of the present invention, an electronic device including a single-walled carbon nanotube (SWNT) is grown using a catalyst-forming approach as discussed above. In one implementation, the electronic device includes a SWNT extending between two electrodes on a substrate, at least one of the electrodes including the catalyst material from which the SWNT is grown. The electrodes are coupled to other circuitry for one or more of a variety of implementations, such as a SWNT-FET (single-walled carbon nanotube field-effect transistor).

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1A:
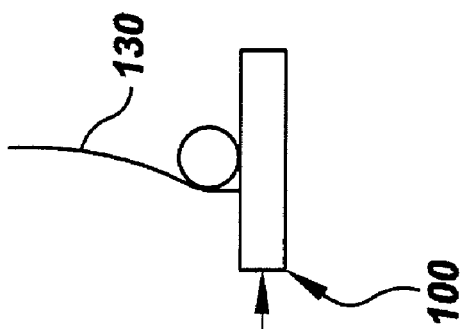
FIGS. 1A-1C show a SWNT at various stages of manufacture, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different devices and implementations, and the invention has been found to be particularly suited for manufacturing carbon nanotubes on a substrate. While the present invention is not necessarily limited to such applications, various aspects of the invention may be appreciated through a discussion of various examples using this context.

According to an example embodiment of the present invention, carbon nanotubes are grown from a substrate using a liquid catalyst delivery approach. A substrate is immersed in a liquid including catalyst precursor material that forms on the substrate in the presence of a reducing agent. The catalyst precursor material is then reacted to form a catalyst material on the substrate. A carbon-containing gas is introduced to the catalyst material and, using the catalyst material to catalyze a reaction of the carbon-containing gas, a carbon nanotube is grown extending from the catalyst material.

According to another example embodiment of the present invention, patterned carbon nanotubes are grown from catalyst material on a substrate using an approach involving immersion of the substrate in a solution including an iron salt, with iron salt particles being formed on the substrate using iron from the solution. The substrate is subsequently calcined and iron oxide catalyst material is formed from the iron salt particles. A carbon-containing gas introduced to the substrate and, using the iron oxide material to catalyze a reaction of the carbon-containing gas, carbon material is deposited (e.g., grown) extending from the iron oxide catalyst material in the form of a SWNT.

In connection with one example embodiment of the present invention, iron-containing nanoparticles have been discovered to spontaneously form on an hydroxylated $SiO_2$ substrate when the substrate is immersed in an aqueous solution including an iron salt (e.g., iron chloride ($FeCl_3$)) and a mild reducing agent (e.g., hydroxylamine). The iron-containing nanoparticles can be formed in a variety of arrangements such as in a particular pattern, a random arrangement and/or in a monolayer. In one implementation, the hydroxyl groups on the $SiO_2$ substrate are used to mediate (e.g., facilitate, or promote) the deposition of the iron-containing nanoparticles in a manner that facilitates the control of the position and characteristics of the nanoparticles. In another implementation, the reaction time (i.e., immersion time) and/or the pH of the aqueous solution is/are selected to achieve one or more particular characteristics for the iron-containing nanoparticles, such as size and density.

After the iron-containing nanoparticles are formed, the substrate is subsequently calcined to form distributed iron oxide ($Fe_2O_3$) nanoparticles thereon. The iron oxide nanoparticles are then used to catalyze the growth of SWNTs and/or nanotube films by chemical vapor deposition. In various applications, this approach is implemented for patterning catalyst material (e.g., $Fe_2O_3$) at sub-micron spacing such that the catalyst material is disposed on a substrate at a distance of less than one micron apart. The relative cleanness maintained using these approaches has been important in forming arrays of nanotube electronic devices, such as field effect transistors (FETs), nanometer-scale wires and others. These devices exhibit characteristics related to this relatively cleanliness.

In another example embodiment, a catalyst growth approach involves growing a $SiO_2$ substrate layer on a p-type silicon (Si) wafer using high-temperature oxidation in a wet environment. The Si wafer is oxidized in an environment (e.g., in a thermal oxidation chamber) that includes hydrogen ($H_2$) and oxygen ($O_2$) at a $H_2:O_2$ ratio of about 3:20 and at a temperature of about 1000° C. The substrate is cleaned with a solvent (e.g., copious amounts of acetone, methanol and/or isopropanol) and then dried under a gas stream including an inert gas, such as nitrogen ($N_2$). After cleaning, the $SiO_2$ substrate is immersed in a scintillation vial containing a solution of about 10 mL of water and about 10 μL of 10 mM $FeCl_3.6H_2O$ (aq). About 100 μL of 40 mM hydroxylamine hydrochloride ($NH_2OH.HCl$) (aq) is immediately introduced into the vial and reacted with the $FeCl_3.6H_2O$ to form iron-containing nanoparticles on the $SiO_2$ substrate. After the formation of the iron-containing nanoparticles, the $SiO_2$ substrate is taken out of the solution, rinsed (e.g., consecutively with water, acetone and isopropyl alcohol) and dried.

The reaction solution discussed above (the solution after reaction of the $FeCl_3.6H_2O$ with the $NH_2OH.HCl$) and reaction time are varied depending upon the application and available equipment. In one implementation, aggregate formation in the reaction solution is inhibited by fresh (e.g., daily) preparation of the solution. In another implementation, the reaction solution has a pH of about 4.8 and concentrations of Fe(III) and hydroxylamine of about 10 μM and 400 μM, respectively. In still another implementation, the solution is mixed (i.e., stirred) and the substrate is allowed to soak in the mixed solution for a certain period of time (e.g., 10 s to 5 min).

After the iron-containing nanoparticles are formed and the $SiO_2$ substrate is cleaned, the substrate is calcined in air at about 800° C. for about 5 min, followed by CVD growth of carbon on the substrate. In one implementation, the CVD growth is effected at a temperature of about 900° C. for about 10 min in a 1" tube furnace under combined flows of 1000 sccm (standard cubic centimeters per minute) of $CH_4$, 500 sccm of $H_2$ carrier gas, and 20 sccm of $C_2H_4$. During the heating process, the carrier gas ($H_2$) flow is switched with the reacting gases after the temperature of the furnace reaches about 830° C. After the carrier gas flow is switched, the furnace temperature is increased to about 900° C.

In another approach involving the furnace chamber such as that discussed above, a co-flow of $H_2$ carrier gas is introduced during the flow of a carbon-containing gas for CVD growth of carbon nanotubes from a substrate having catalyst particles formed thereon. The amount of $H_2$ co-flow is selected to maintain growth of carbon nanotubes while inhibiting undesirable material from forming on the substrate (e.g., inhibiting pyrolysis). For general information regarding carbon nanotube growth, and for more specific information regarding co-flow approaches that may be implemented in connection with one or more of the example embodiments of the present invention, reference may be made to U.S. patent application Ser. No. 10/285,311 filed on Oct. 31, 2002 and entitled "Carbon Nanotube Growth," now U.S. Pat. No. 7,183,228, which is fully incorporated herein by reference.

Figure 1B:
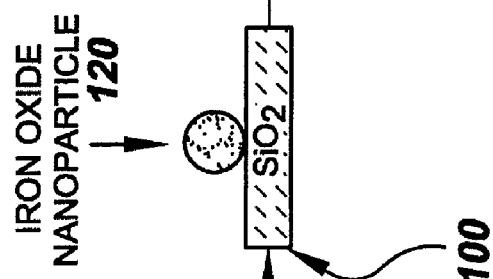
Figure 1C:
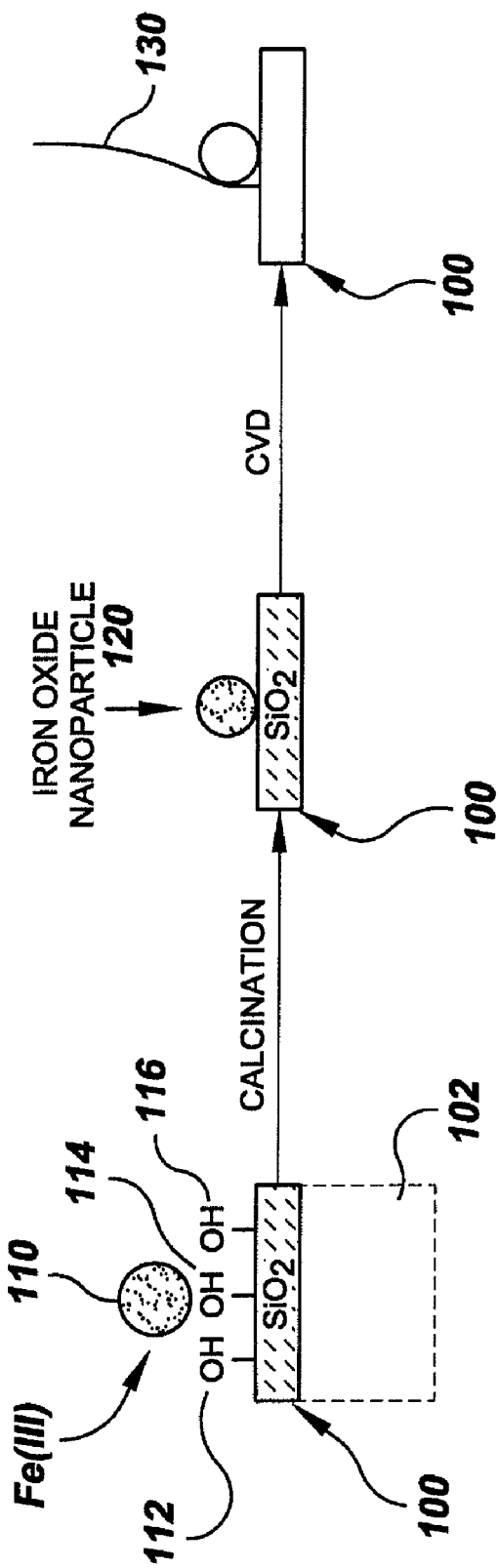

FIGS. 1A-1C show a carbon nanotube device at various stages of manufacture, according to another example embodiment of the present invention. Beginning with FIG. 1A, a silicon dioxide ($SiO_2$) substrate 100 is used as a base for growing carbon nanotubes. Optionally, the $SiO_2$ substrate 100 is formed as a layer on a silicon wafer 102. The $SiO_2$ substrate is hydroxylated to form a plurality of hydroxyl (OH) groups 112, 114 and 116 on a surface thereof, with a multitude of such hydroxyl groups being contemplated (and three shown here for brevity). An iron-containing nanoparticle 110 is then formed on the $SiO_2$ substrate 100 using a solution including an iron salt. As with the hydroxyl groups 112, 114 and 116, a multitude of such iron-containing nanoparticles are contemplated with one shown here for brevity. In one implementation, the $SiO_2$ substrate 100 is immersed in a solution including the iron salt and hydroxylamine as a mild reducing agent, with the $SiO_2$ substrate being hydroxylated and the iron-containing nanoparticles 110 being formed using the same solution. For example, a solution including hydroxylamine hydrochloride ($NH_2OH\cdot HCl$) (aq) and $FeCl_3\cdot 6H_2O$ can be used as discussed above in forming the iron-containing nanoparticles 110 on the $SiO_2$ substrate 100.

Referring now to FIG. 1B, after the iron-containing nanoparticle(s) 110 are formed, the $SiO_2$ substrate 100 with the nanoparticles thereon is calcined to form iron oxide nanoparticles 120 (only one shown here for brevity) on the $SiO_2$ substrate. With the iron oxide nanoparticles 120 in place, the $SiO_2$ substrate 100 is placed into a CVD arrangement. A carbon-containing gas is then introduced to the $SiO_2$ substrate and reacted to grow a carbon nanotube 130 as shown in FIG. 1C.

Various implementations of the example embodiments discussed above in connection with FIGS. 1A-1C include the formation of the carbon nanotube 130 as part of a large array of carbon nanotubes, as part of a film of nanotubes and as part of a nanotube device. In one example, an array of carbon nanotubes grown using this approach is implemented for sensing molecules. In another example, a single carbon nanotube and/or a film of carbon nanotubes is implemented as part of an electronic circuit, with the carbon nanotube(s) extending across electrodes, source/drain regions or otherwise electrically coupled to other circuitry. For instance, the iron oxide nanoparticles 120 can be formed at an electrode or source/drain region location such that the carbon nanotube 130 grows extending therefrom. In still another example, the carbon nanotube(s) are formed extending from a tip adapted for atomic force microscopy, e.g., with the iron oxide nanoparticles 120 being formed on a cantilever tip such that the carbon nanotube 130 extends from the cantilever tip.

For general information regarding carbon nanotubes, and for specific information regarding carbon nanotube implementations to which one or more example embodiments of the present invention may be applicable, including those embodiments discussed in the previous paragraph, reference may be made to the following patent documents, all of which are fully incorporated herein by reference: U.S. patent application Ser. No. 10/042,426, filed on Jan. 7, 2002 and entitled "Carbon Nanotube Structure Having a Catalyst Island" (e.g., to which formation of iron oxide nanoparticles discussed herein may apply); U.S. patent application Ser. No. 10/175,026, filed on Jun. 18, 2002 and entitled "Carbon Nanotube Devices" (e.g., to which formation of carbon nanotubes discussed herein may apply); U.S. patent application Ser. No. 09/858,783, filed on May 15, 2001 and now U.S. Pat. No. 6,900,580, entitled "Self-oriented Bundles of Carbon Nanotubes and Method of Making Same" (e.g., to which formation of iron oxide nanoparticles discussed herein may apply); and U.S. patent application Ser. No. 10/164,891, filed on Jun. 7, 2002 and entitled "Carbon Nanotubes and Methods of Fabrication Thereof Using a Catalyst Precursor" (e.g., to which formation of iron oxide nanoparticles discussed herein may apply and to which implementations with carbon nanotubes as probe tips may apply).

In another example embodiment (and referring again to FIG. 1A), the $SiO_2$ substrate 100 is soaked in an hydroxylamine/$FeCl_3$ solution for about 2 minutes to form the iron oxide nanoparticle(s) 110. In one implementation, a plurality of the nanoparticle(s) 110 is formed on the $SiO_2$ substrate 100 to substantially cover the $SiO_2$ substrate in a layer having a thickness of about one nanoparticle (e.g., by forming a monolayer of the nanoparticles). The height of the nanoparticle(s) 110 is varied depending upon the application, available equipment and processing variations, and in one implementation, the average height of nanoparticles manufactured using this approach is about 2.2±0.9 nm.

In another particular example embodiment, the $SiO_2$ substrate 100 is calcined with the nanoparticles 110 thereon at about 800° C. in air for about 5 minutes to form the iron oxide nanoparticles 120 discussed above in connection with FIG. 1B. In some implementations, the iron oxide nanoparticles 120 formed using this calcination approach have an average height of about 1.5±0.6 nm and a similar area density as the iron-containing nanoparticles 110 (before calcination).

Figure 2:
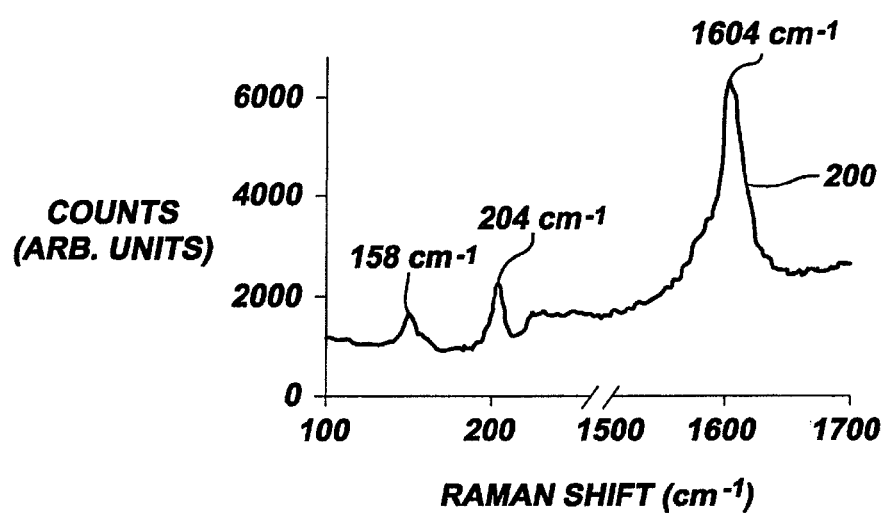
FIG. 2 shows a micro-Raman spectroscopy image of SWNTs formed in connection with another example embodiment of the present invention.

FIG. 2 shows a resonant Raman spectrum plot 200 associated with SWNTs grown from hydroxylamine-derived nanoparticles in connection with another example embodiment of the present invention. The spectrum plot 200 is obtained using SWNTs from an area of about 1 $\mu m^2$ on a $SiO_2$ substrate (e.g., such as $SiO_2$ substrate 100 in FIG. 1).

A measure of the nanotube diameter (d, in nm) is made from the Raman shift ($\omega_r$, in $cm^{-1}$) of the SWNT's radial breathing mode by $d=248\ cm^{-1}\ nm/\omega_r$. The two peaks at $158\ cm^{-1}$ and $204\ cm^{-1}$ show radial breathing modes of two SWNTs with diameters of 1.6 and 1.2 nm respectively. The peak at $1604\ cm^{-1}$ corresponds to an in-plane vibrational mode of a graphene sheet centered at $1580\ cm^{-1}$. This approach can be used, for example, in connection with experimental and manufacturing growth facilitated by the catalyst delivery approaches discussed above. Using the relatively clean approach for catalyzed nanotube growth, this Raman spectrum plot 200 is facilitated. For general information regarding Raman spectra and for specific information regarding Raman spectra applications that may be implemented in connection with one or more example embodiments discussed herein, reference may be made to Jorio, A.; Saito, R.; Hafner, J. H.; Lieber, C. M.; Hunter, M.; McClure, T.; Dresselhaus, G.; Dresselhaus, M. S., *Phys. Rev. Lett.* 2001, 86, 1118-1121, which is fully incorporated herein by reference.

Figure 3:
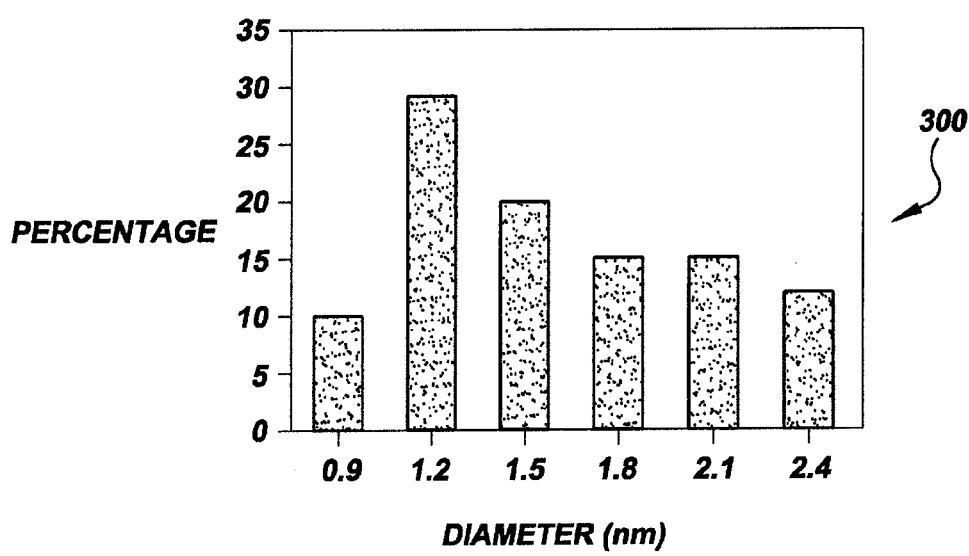
FIG. 3 shows a nanotube diameter distribution measured from resonance micro-Raman data for nanotubes formed in connection with another example embodiment of the present invention.

FIG. 3 is a bar graph 300 showing a range of diameters for SWNTs manufactured in connection with one or more example embodiments of the present invention. Using about 100 micro-Raman spectra plots (e.g., similar to plot 200 shown in FIG. 2) for 164 nanotubes, the diameters of the nanotubes shown range from 0.9 to 2.4 nm. With this relatively clean catalyst delivery approach, Raman spectra data can be used for detecting variation in the manufacture of SWNTs.

In another example embodiment of the present invention, a substrate is soaked in an iron-containing solution for a time that is selected to set the population of iron-containing nanoparticles formed on the substrate for carbon nanotube growth. In connection with this example embodiment, it has been discovered that a longer soaking time results in a higher density of iron-containing nanoparticles. For example, in one implementation (and referring to FIG. 1A), the $SiO_2$ substrate 100 is soaked in a solution including an iron salt and reducing agent for an amount of time selected for controlling the density of the iron-containing nanoparticles 110 on the $SiO_2$ substrate. By performing experiments with particular types of substrates, solutions and other conditions, a particular density of particles for a particular amount of soaking time is identified. This density-related time is then used for setting the density of the iron-containing nanoparticles during the formation of such nanoparticles on additional substrates.

In another example embodiment, also referring to FIG. 1A, the size of the iron-containing nanoparticles 110 formed on the substrate is set using a soaking time selected for the particular size. For instance, in connection with this example embodiment, it has been discovered that a relatively long immersion time (e.g., greater than 10 min) can be used to achieve iron-containing nanoparticles having a relatively large diameter. Using this approach, a greater soaking time is used to form larger iron-containing nanoparticles. In addition, experiments are performed as discussed in the preceding paragraph, with times being identified for growing iron-containing nanoparticles of selected diameter.

In another example embodiment of the present invention, the pH of a solution including an iron salt and a reducing agent in which a $SiO_2$ or other substrate is soaked is selected to achieve particular deposition characteristics of iron-containing nanoparticles onto the substrate. In one implementation, the pH of the solution is set relatively low (e.g., about 2.3) for soaking a fully hydroxylated $SiO_2$ wafer to achieve a relatively large density of iron-containing nanoparticles. In another implementation, a base (e.g., $NH_4OH$) is added to the solution to achieve a relatively low pH. In another implementation, the pH of the solution is altered (e.g., using an acid or base addition approach) to achieve a pH of about 5 for iron-containing nanoparticle deposition.

Figure 4A:
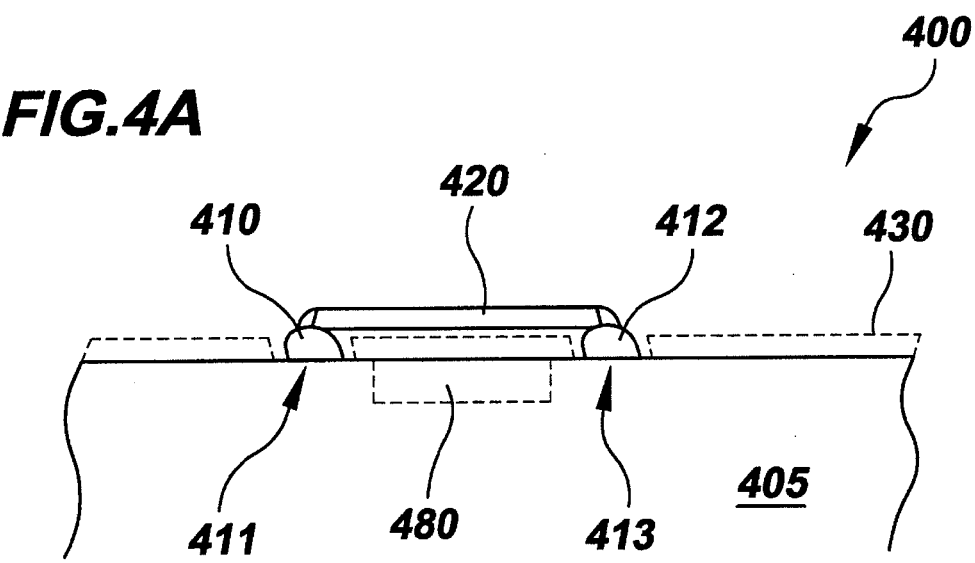
FIG. 4A shows a SWNT device formed using a liquid catalyst delivery approach involving patterned catalyst material, according to another example embodiment of the present invention.

FIG. 4A shows a carbon nanotube device 400 grown using a catalyst (i.e., iron oxide) nanoparticle formation approach such as those discussed herein, according to another example embodiment of the present invention. The device 400 includes a substrate 405 (i.e., a $SiO_2$ substrate) and a SWNT 420 extending between two electrodes 410 and 412 formed on the substrate. An iron oxide material is formed on, at or as a part of at least one of the two electrodes 410 and 412. The substrate 405 with the iron oxide material is prepared as discussed above, for example in connection with FIGS. 1A and 1B, by immersion in a solution and subsequent calcination. The carbon nanotube 420 is then grown, for example also using the approach discussed in connection with FIG. 1C involving CVD growth.

In one particular implementation, the electrodes 410 and 412 are formed using a patterning approach, prior to immersion of the substrate 405 in a solution. A patternable material, shown by dashed lines 430, is formed on the substrate 405 and wells 411 and 413 are patterned therein at locations where the electrodes 410 and 412 are to be respectively formed. In one instance, the wells 411 and 413 have an area of about $0.5 \times 0.5\ \mu m^2$. In another implementation, the patternable material 430 is a polymethylmethacrylate (PMMA) photoresist layer spun on the substrate 405, with the wells 411 and 413 being patterned using, for example, electron beam lithography or other conventional photolithography techniques to remove a portion of the PMMA 430.

After the wells 411 and 413 have been patterned, the substrate 405 is soaked in an hydroxylamine/$FeCl_3$ solution (e.g., for about 5 minutes) for deposition of iron-containing nanoparticles in the wells. The patternable material 430 is then lifted off and the substrate 405 is calcined to grow iron oxide nanoparticles in the wells 411 and 413 where electrodes 410 and 412 are to be formed. In one implementation, a sub-monolayer of iron oxide nanoparticles having a height of about 2 nm is formed over the patternable material 430 and in the wells 411 and 413, with a portion of the sub-monolayer being removed when the patternable material is lifted off. CVD synthesis is used to grow the SWNT 420 emanating from iron oxide nanoparticles in one of the wells. In another implementation, conductive material (e.g., Ti/Au) is formed in one or both of the wells 411 and 413 to form the electrodes 410 and 412. In another implementation, iron oxide nanoparticles are formed in only one of the two wells 411 and 413, with the SWNT 420 being grown from the iron oxide nanoparticles and extending to conductive material in another one of the two wells.

In another implementation, conductive material is formed over iron oxide nanoparticles in the wells 411 and 413, prior to and/or after the formation of the SWNT 420. By placing electrodes 410 and 412 around the iron oxide nanoparticles in an arrayed fashion, a variety of types of relatively clean nanotube electrical devices are formed with a high yield. In one instance, the electrodes 410 and 412 and the substrate 405 are implemented as source, drain and silicon back-gate, respectively to for a SWNT-FET (e.g., with the SWNT 420 extending about a 400 nm between the source/drain electrodes 410 and 412).

Figure 4B:
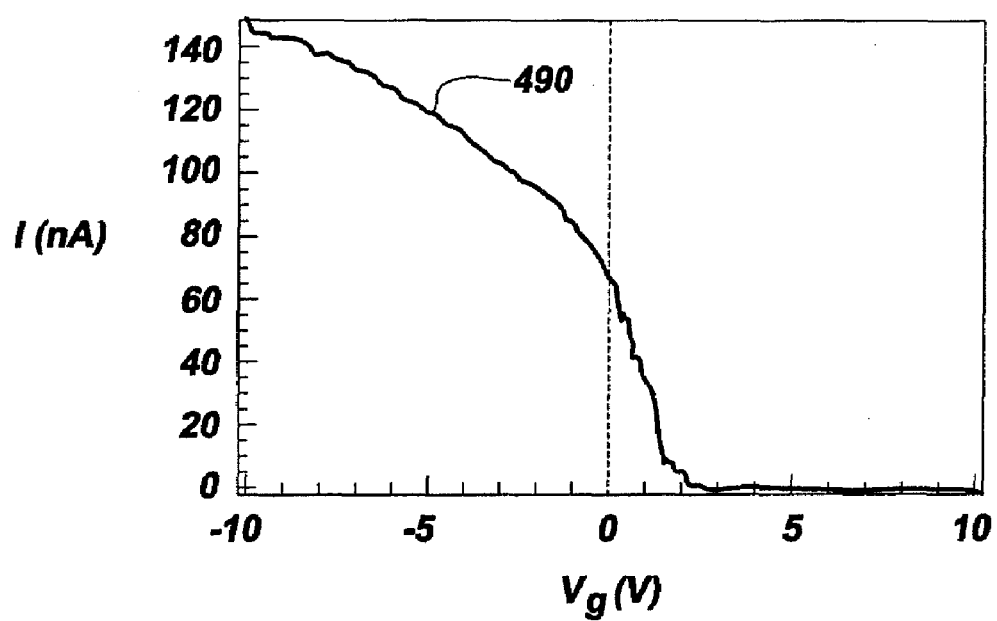
FIG. 4B shows source-drain current (I) vs. back-gate voltage (Vg) for a SWNT-FET including a nanotube grown from a catalyst material formed using a liquid catalyst delivery approach, according to another example embodiment of the present invention.

FIG. 4B shows a plot 490 of current (I) versus drain voltage (V) for the SWNT device 400 shown in FIG. 4A with a back gate 480 in the substrate 405, according to another example embodiment of the present invention. This back-gated implementation of the SWNT device 400 exhibits typical p-type FET characteristics, with current increasing with negative voltage applied to the back gate 480. The wells 411 and 413 are thus patterned on opposite sides of the back gate 480, such that the SWNT 420, when grown therebetween, is adjacent to the back gate. In one implementation, a dielectric material is formed between the back gate 480 and the SWNT 420.

Figure 4C:
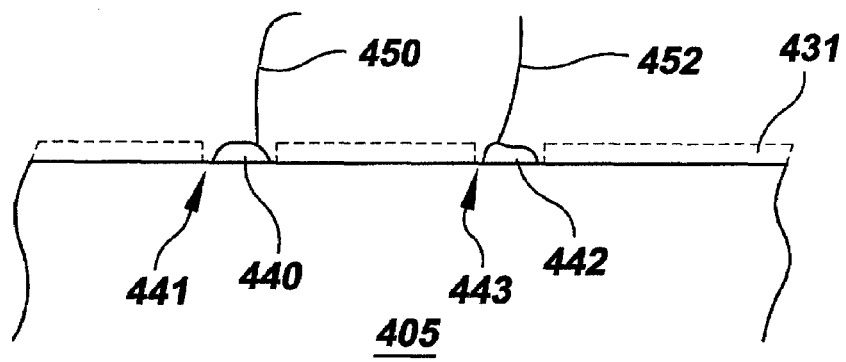
FIG. 4C shows SWNTs grown from catalyst material patterned using a liquid catalyst delivery approach, according to another example embodiment of the present invention.

FIG. 4C shows another approach for growing SWNTs that is similar to that discussed in connection with FIG. 4A, according to another example embodiment of the present invention. In this instance, wells 441 and 443 are formed in a PMMA layer 431 on a $SiO_2$ substrate 405, and catalyst portions 440 and 442 are formed in the wells using one of the solution immersion and calcination approaches discussed herein. SWNTs 450 and 452 are then grown extending from the catalyst portions 440 and 442 using CVD deposition of carbon. With this approach, patterned growth of SWNTs can be achieved for a variety of implementations.

Figure 5:
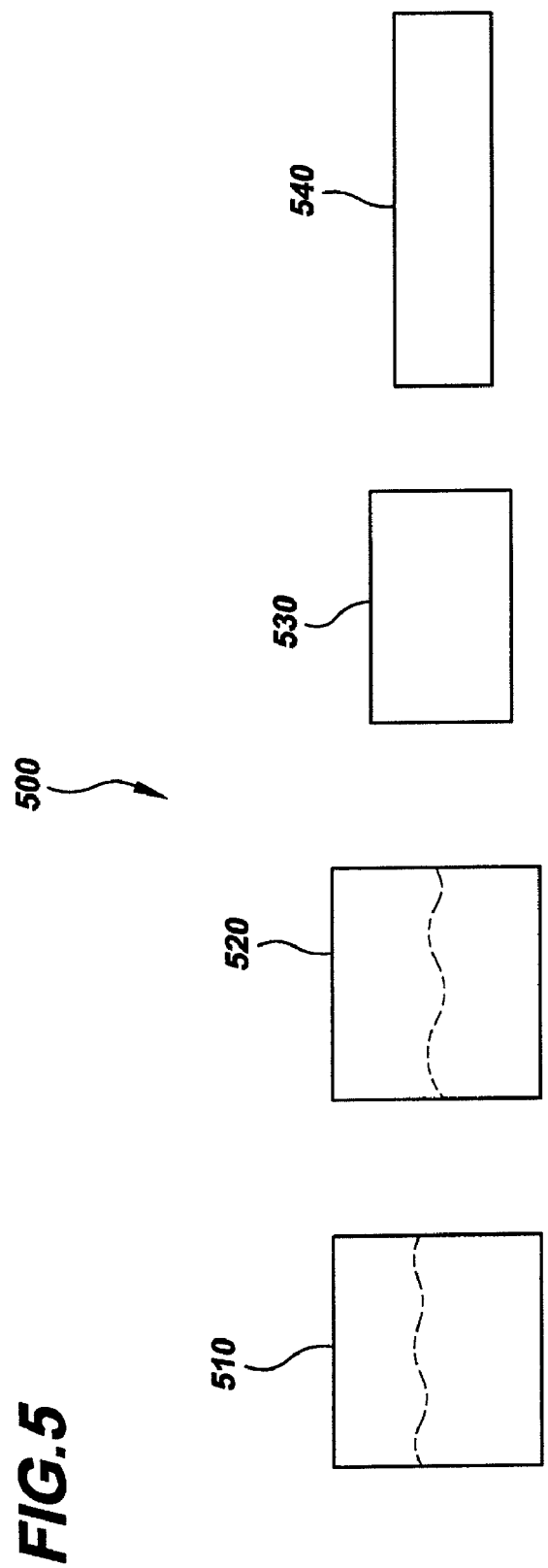
FIG. 5 shows a system for nanotube growth, according to another example embodiment of the present invention.

FIG. 5 shows a system 500 for preparing a substrate and growing a carbon nanotube, according to another example embodiment of the present invention. An immersion chamber 510 is adapted to hold hydroxyl material and a silicon oxide substrate for forming hydroxyl groups on the silicon oxide substrate. An immersion tank 520 is adapted to hold an aqueous solution including an iron-containing salt and hydroxylamine, into which the silicon oxide substrate (with hydroxyl groups thereon) is placed. Iron-containing nanoparticles are formed on the substrate in the immersion tank 520, after which the substrate is placed into a furnace arrangement 530 adapted for calcining the substrate and forming iron oxide nanoparticles thereon. A chemical deposition chamber 540 is adapted for holding the silicon oxide substrate and, using the iron oxide nanoparticles as a catalyst, introducing a carbon-containing gas to the substrate growing carbon nanotubes extending from the iron oxide nanoparticles.

Various alternate approaches to the examples discussed herein are implemented in a variety of other example embodiments. For example, substrates such as porous substrates, other silicon-containing substrates and germanium-containing substrates are used in addition to and/or as an alternative to $SiO_2$ substrates in various approaches. In addition, $SiO_2$ substrates used for growing the carbon nanotubes are formed using a variety of approaches for different implementations, depending upon the application and available material. For instance, $SiO_2$ wafers formed using oxidation in wet environment, $SiO_2$ wafers treated in boiling piranha solution at 90° C. and/or thermally grown $SiO_2$ wafers calcined in ambient air at about 800° C. for 10 minutes represent various approaches used in forming $SiO_2$ substrates. Using these approaches and in connection with an example embodiment of the present invention, it has been discovered that, upon relatively brief exposure (e.g., about 1 minute of soaking) in an hydroxylamine/$FeCl_3$ solution, nanoparticles deposited on piranha-treated $SiO_2$ wafers exhibit density and morphology similar to that of nanoparticles deposited on thermally grown $SiO_2$ wafers. It has similarly been discovered that less deposition of iron-containing nanoparticles is observed on a $SiO_2$ substrate implemented with the 800° C. calcination approach, relative to the wet oxidation and boiling piranha solution approaches. In addition, other reducing agents can be used in addition to and/or as an alternative to hydroxylamine in various implementations. Moreover, referring again to FIG. 1, other groups may be used in addition to or in the alternative of the hydroxyl groups 112 shown on the $SiO_2$ substrate 100.

Based on the above discussion and illustrations, those skilled in the art will readily recognize that various modifications and changes may be made to the present invention without strictly following the exemplary embodiments and applications illustrated and described herein. For instance, such changes may include modifying the nanotubes for selected applications, altering the arrangement and orientation of the nanotubes, interchanging nanotube films and single nanotubes, using a variety of substrate types and where appropriate, using SWNTs as building blocks for more complex devices, such as MWNTs. Furthermore, the nanotubes may include materials other than carbon, such as silicon and/or boron, which also may be grown using a synthesis process similar to that described above. Such modifications and changes do not depart from the spirit and scope of the present invention.

What is claimed is:

1. A method for growing a plurality of carbon nanotubes, the method comprising:
   forming hydroxyl groups on a silicon-oxide substrate;
   immersing the substrate in an aqueous solution including an iron-containing salt and hydroxylamine and forming iron-containing nanoparticles on the substrate;
   calcining the substrate and forming iron oxide nanoparticles thereon; and
   using the iron oxide nanoparticles as a catalyst, growing carbon nanotubes.

2. The method of claim 1, wherein growing carbon nanotubes includes introducing a carbon-containing gas to the iron oxide nanoparticles and, using the iron oxide as a catalyst, reacting the carbon-containing gas and growing the carbon nanotubes from the iron oxide nanoparticles with carbon from the reaction.

3. The method of claim 1, wherein forming iron oxide nanoparticles includes forming a sub-monolayer of uniformly distributed iron-oxide nanoparticles.

4. The method of claim 1, wherein calcining the substrate and forming iron oxide nanoparticles includes converting the iron-containing nanoparticles to $Fe_2O_3$.

5. The method of claim 1, wherein immersing the substrate in an aqueous solution including an iron-containing salt and hydroxylamine and forming iron-containing nanoparticles on the substrate includes reducing the iron-containing salt to form the iron-containing nanoparticles.

6. The method of claim 5, wherein reducing the iron-containing salt includes using the hydroxylamine to reduce the iron-containing salt.

7. The method of claim 1, wherein immersing the substrate in an aqueous solution including an iron-containing salt and hydroxylamine and forming iron-containing nanoparticles on the substrate includes using hydroxyl groups on the silicon-oxide substrate to mediate the formation of the iron-containing nanoparticles.

8. The method of claim 1, wherein immersing the substrate in an aqueous solution including an iron-containing salt and hydroxylamine and forming iron-containing nanoparticles on the substrate includes selecting the pH of the aqueous solution to control at least one of: the size and density of the iron-containing nanoparticles.

9. The method of claim 8, wherein immersing the substrate in an aqueous solution including an iron-containing salt and hydroxylamine and forming iron-containing nanoparticles on the substrate includes selecting the reaction time that the substrate is immersed to control at least one of: the size and density of the iron-containing nanoparticles.

10. The method of claim 1, wherein immersing the substrate in an aqueous solution including an iron-containing salt and hydroxylamine and forming iron-containing nanoparticles on the substrate includes selecting the reaction time that the substrate is immersed to control at least one of: the size and density of the iron-containing nanoparticles.

11. The method of claim 1, wherein immersing the substrate in an aqueous solution including an iron-containing salt includes immersing the substrate in an aqueous solution including iron-chloride material.

12. The method of claim 1, wherein forming hydroxyl groups on the silicon-oxide substrate includes hydroxylating the silicon-oxide substrate with the hydroxylamine.

13. The method of claim 1, wherein growing carbon nanotubes includes growing a single-walled carbon nanotube.

14. The method of claim 1, wherein calcining the substrate and forming iron oxide nanoparticles thereon includes forming a catalyst island.

15. The method of claim 1, wherein growing carbon nanotubes includes forming a nanotube field effect transistor.

16. The method of claim 1, wherein growing carbon nanotubes includes growing at least one carbon nanotube extending between two electrodes.

17. The method of claim 1, further comprising:
patterning wells in a patternable material on the substrate; and
wherein forming iron-containing nanoparticles on the substrate includes forming iron-containing nanoparticles in the wells, wherein calcining the substrate and forming iron oxide nanoparticles includes forming iron oxide nanoparticles from the iron-containing nanoparticles formed in the wells and wherein growing carbon nanotubes includes growing carbon nanotubes extending from the iron oxide.

18. The method of claim 17, wherein growing carbon nanotubes extending from the iron oxide in the wells includes growing a carbon nanotube extending between two electrodes.

19. The method of claim 18, further comprising forming a back gate in the substrate and between the two electrodes, the back gate being configured and arranged to capacitively couple a voltage to the carbon nanotube extending between two electrodes.

20. The method of claim 17, further comprising removing the patternable material after forming the iron-containing nanoparticles and prior to calcining the substrate and forming iron oxide nanoparticles.

21. The method of claim 17, further comprising removing the patternable material after forming the iron-containing nanoparticles and prior to growing carbon nanotubes extending from the iron oxide.

\* \* \* \* \*